United States Patent [19]

Savage

[11] Patent Number: 4,938,555
[45] Date of Patent: Jul. 3, 1990

[54] OPTICAL SWITCH

[75] Inventor: Richard N. Savage, Livermore, Calif.

[73] Assignee: SC Technology, Int., Livermore, Calif.

[21] Appl. No.: 233,117

[22] Filed: Aug. 16, 1988

[51] Int. Cl.$^5$ ............................................. G02B 6/26
[52] U.S. Cl. .............................. 350/96.15; 350/96.13; 350/96.18
[58] Field of Search ............... 350/96.13, 96.15, 96.16, 350/96.18, 96.20, 96.21

[56] References Cited

U.S. PATENT DOCUMENTS 4,261,638  4/1981  Wagner ............................ 350/96.15
4,484,793 11/1984  Laude ........................... 350/96.15 X

FOREIGN PATENT DOCUMENTS 0167106 12/1981 Japan ................................. 350/96.20
2178869  2/1987 United Kingdom ............. 350/96.15

Primary Examiner—Frank Gonzalez
Assistant Examiner—Phan T. Heartney
Attorney, Agent, or Firm—Flehr, Hohbach, Test, Albritton & Herbert

[57] ABSTRACT

An optical switch for transmitting light between a first location and a selected one of a plurality of second locations. The switch includes a mirror having a concave, reflective surface and an axis. The switch also includes a plurality of fiber optic cables, one of which is disposed at the first location and the remainder of which are disposed at the second locations, each cable having a light transmission face at their respective locations. The light transmission face at the first location is substantially parallel to the focal plane of the mirror. The light transmission face at each of the second locations is at an angle which intersects with the axis. A motor connected to the mirror for eccentric rotation thereof with respect to its axis to direct light between the first location and individual ones of the second locations depending upon the rotational position of said mirror about the axis to complete the light switch.

The light transmission face at the first location is substantially parallel to the focal plane of the mirror and substantially perpendicular to the axis thereof, and the light transmission face at each of the second locations is at a defined angle to the focal plane. The mirror is preferably spherically concave, or elliptically concave, or parabolicly concave.

15 Claims, 6 Drawing Sheets

OPTICAL SWITCH

BACKGROUND OF THE INVENTION

This invention relates to light switching devices and more particularly to switching devices for optical apparatus, such as spectrophotometers, photomicroscopes, spectroscopes and the like, which require light to operate. Typically one optical device is connected to one light source, for example, a spectrophotometer may be connected to a fiber optic cable through which input light to the spectrophotometer is transmitted. If it is desirable to illuminate a different optical device the light source must be disconnected from the first optical device and reconnected to the second. In other words, heretofore in the art, "switching" from one optical device to another, or from one source of illumination to another, has been accomplished manually.

Manual switching has numerous disadvantages. Obviously, whenever switching is desired, the operator of the devices must spend time disconnecting the input light source from one device and reconnecting the input light source to the second device. If the optical devices sharing a light source are not placed in close proximity to each other, the operator must spend additional time traveling between the devices. Alternatively, optical devices may be arranged in the same location; however, the operator must still manually disconnect the input light source, for example, a fiber optic cable, connected with the first device and reconnect it to the second device. Obviously, manual switching wastes time and is not accomplished readily or easily.

Feeding light from different sources, for example, from different fiber optic cables, to a single optical device creates similar problems. The operation must still be accomplished manually, with the operator either moving from source location to source location to disconnect and reconnect the cables or moving to a central location to accomplish the task.

SUMMARY OF THE INVENTION

Therefore, it would be advantageous to provide a device that can switch an input source of light to a number and/or variety of optical devices and can switch a single optical device among several light sources. The present invention provides such a device.

The optical switch of the present invention provides for transmitting light between a first location and a selected one of a plurality of second locations. It comprises a mirror having a concave, reflective surface and an axis, light transmission means facing the mirror and having a light transmission face at the first location and each of said second locations, and means connected to the mirror for eccentric rotation of the mirror about its axis to direct the light between the first location and individual ones of the second locations depending upon the rotational position of the mirror about its axis. Special embodiments of the invention may include a mirror which is spherically concave, elliptically concave, or parabolicly concave. The second locations may be concentrically disposed about the first location. The light transmission means is positioned at substantially the focal plane of the mirror. The light transmission face at the first location is substantially parallel to the focal plane of the mirror and substantially perpendicular to the axis of the mirror. At each of the second locations, the light transmission face is at an angle to the focal plane. The angle is defined as the arc tangent of the ratio of the distance between the center of the light transmission face at the first location and the center of the light transmission face at one of the second locations and the distance of a line normal to the focal plane and extending between the first location and the reflective surface of the mirror.

The rotation means of the present invention comprises a motor connected to the mirror and having a rotatable shaft with its longitudinal axis aligned with the first location and with the mirror mounted eccentrically on the shaft. The rotation means of the present invention further comprises control means for controlling the rotation of the shaft such that the mirror may be positioned between the first location and a selected one of the second locations to direct images.

In a preferred embodiment, the motor is a stepping motor and the light transmission means comprises a plurality of fiber optic cables, one of the cables being positioned at the first location and each of the remainder of the cables being located at one of the plurality of second locations.

Alternatively, the rotations means of the present invention may comprise a direct current motor and motor sensing means for activating and deactivating the direct current motor. In either case, the rotation means further includes sensing means for sensing a defined, home position of the motor. The sensing means comprises an optical sensor coupled to the control means to sense the home position of the motor and signal the position to the control mean.

Preferably, the diameters of the fiber optic cables at the second locations are substantially equal to each other and the diameter of the cable at the first location is substantially unequal to the diameters of the cables at the second location. However, the diameters of all of the cables may be substantially equivalent, without unduly limiting the operability of the invention. In addition, the fiber optic cables may be preferably mounted in a unitary mounting member to ensure their proper location and angular orientation.

These and other features of the present invention are more easily understood with reference to the following figures.

DETAILED DESCRIPTION

Figure 1:
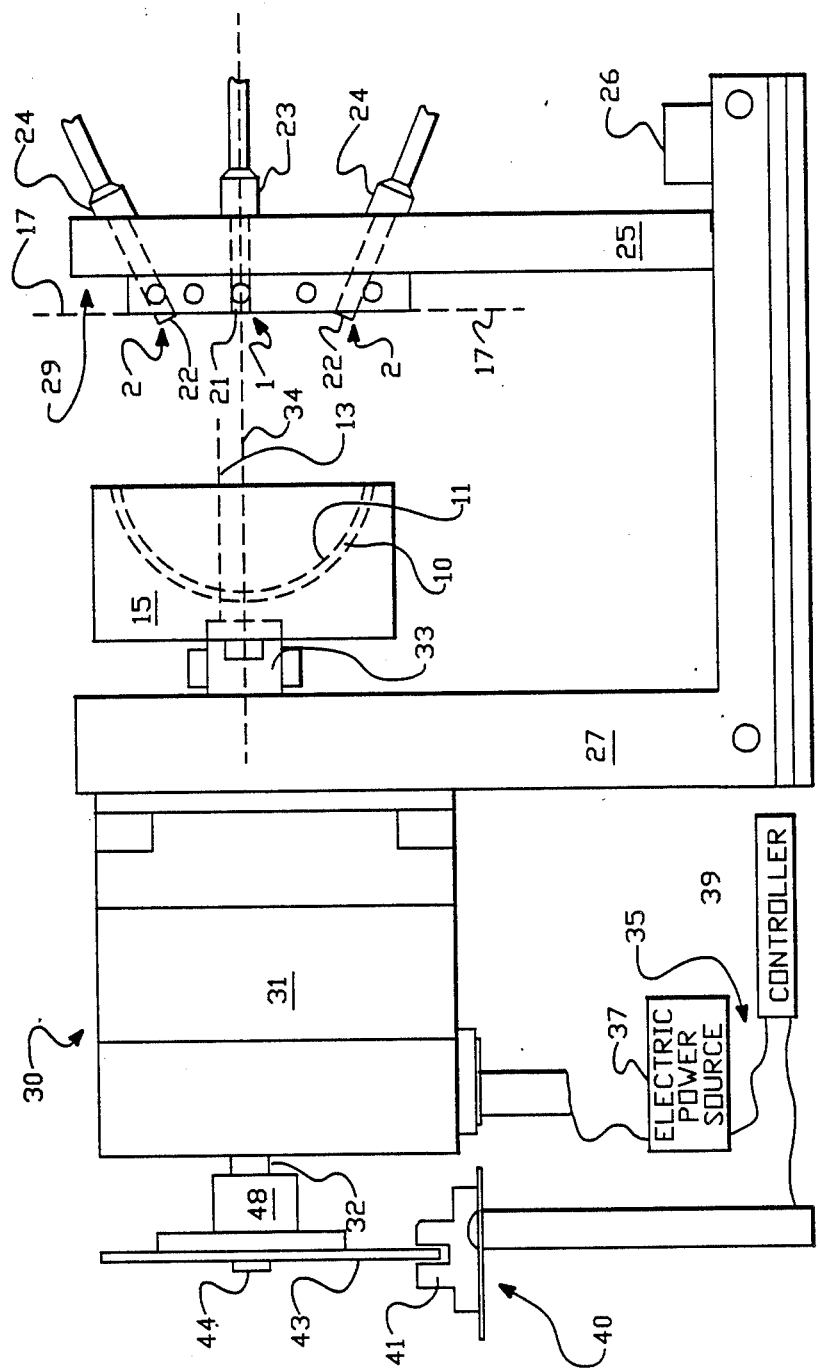
FIG. 1 is top plan view of the optical switch of the present invention.

Referring to FIG. 1, there is shown the optical switch of the present invention for transmitting light between a first location, generally designated 1, and a selected one of a plurality of a second locations, each of which is generally designated 2. The optical switch comprises a mirror, 10, having a concave reflective surface, 11, an axis 13, shown by the dotted lines in FIG. 1, and a focal plane, 17, shown generally in FIG. 1 and shown specifically in FIGS. 4–6 for the particular mirror illustrated therein. Mirror 10 is mounted in mirror mount 15 such that reflective surface 11 faces the light transmission means, generally designated 20.

Figure 4:
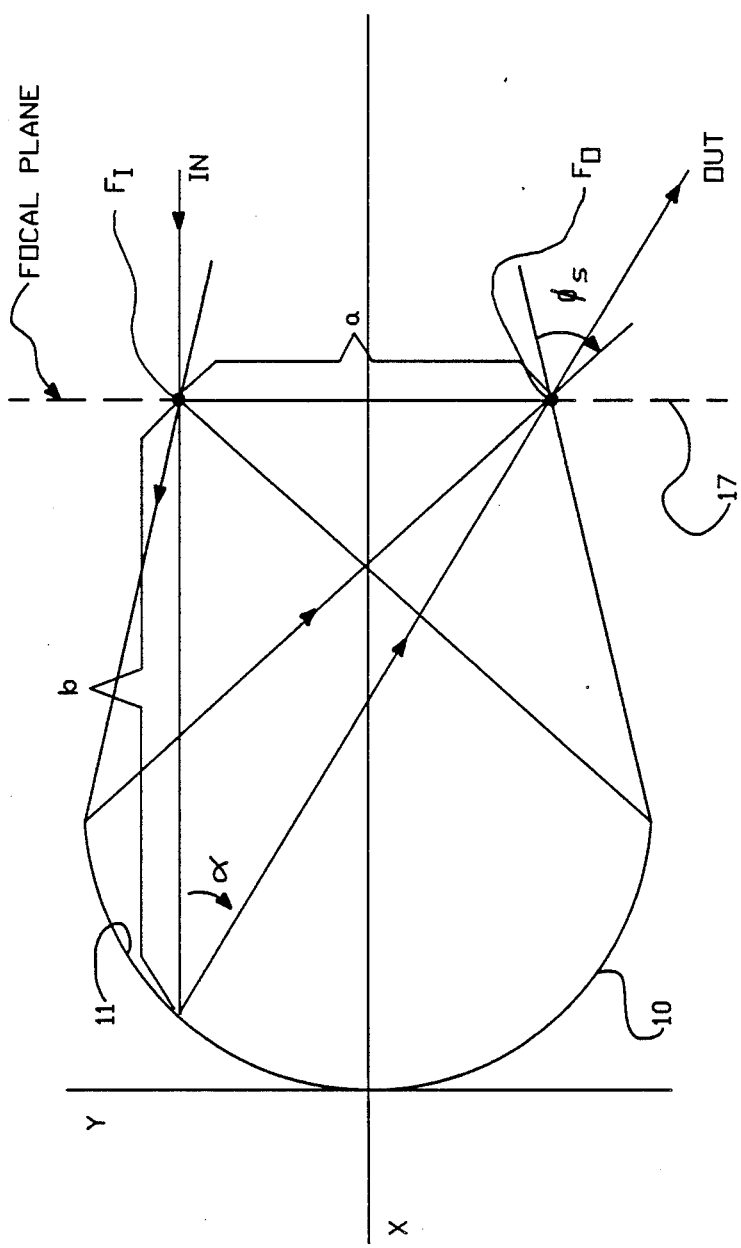
FIGS. 4–6 are schematic ray tracing illustrations showing the path the light takes using the spherical concave (FIG. 4), elliptical concave (FIG. 5) and parabolic concave (FIG. 6) mirrors of the present invention.
Figure 5:
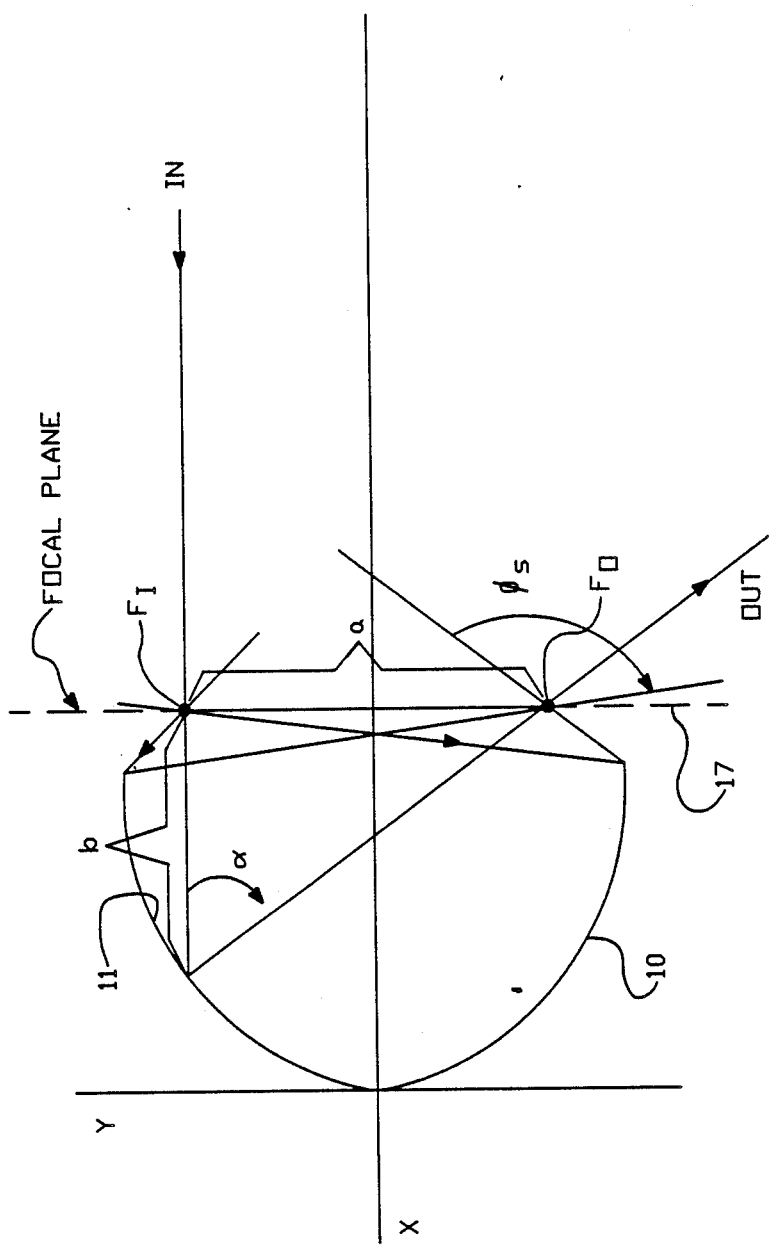
Figure 6:
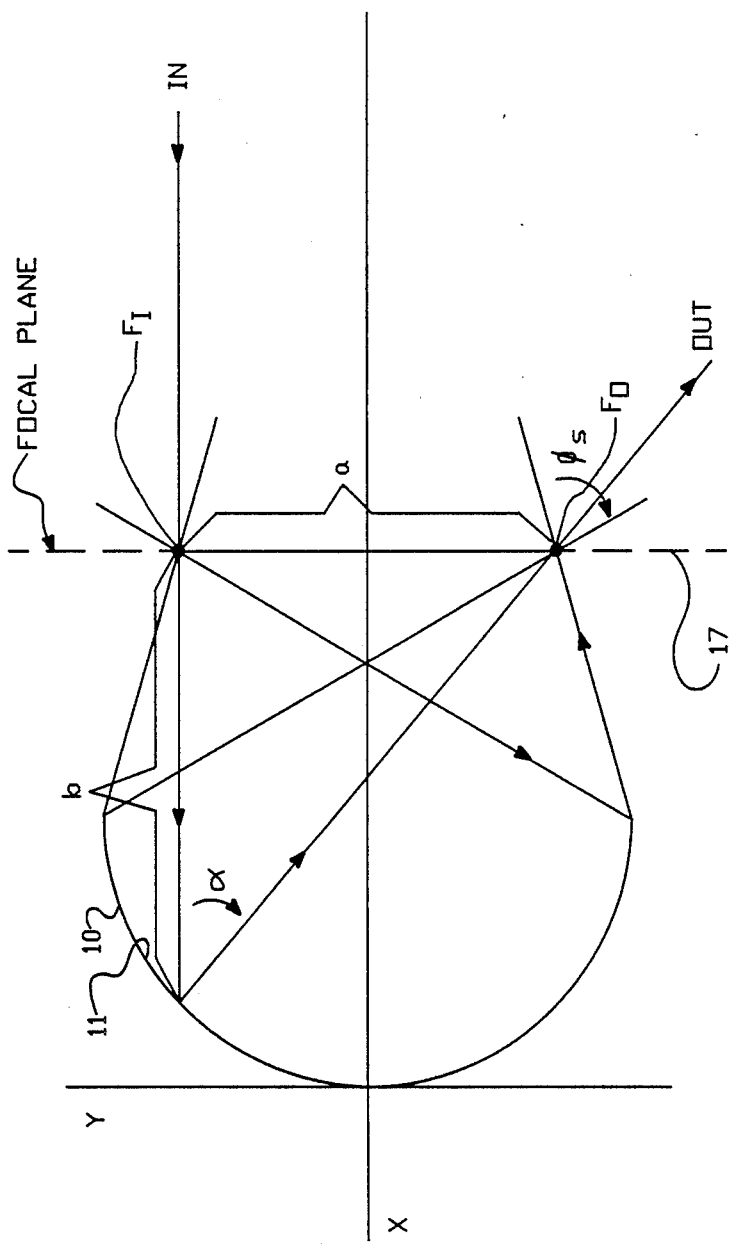

As illustrated in the ray tracings of FIGS. 4–6, wherein like numerals designate like elements, mirror 10 may be spherically concave (FIG. 4), elliptically concave (FIG. 5) or parabolicly concave (FIG. 6).

Figure 2:
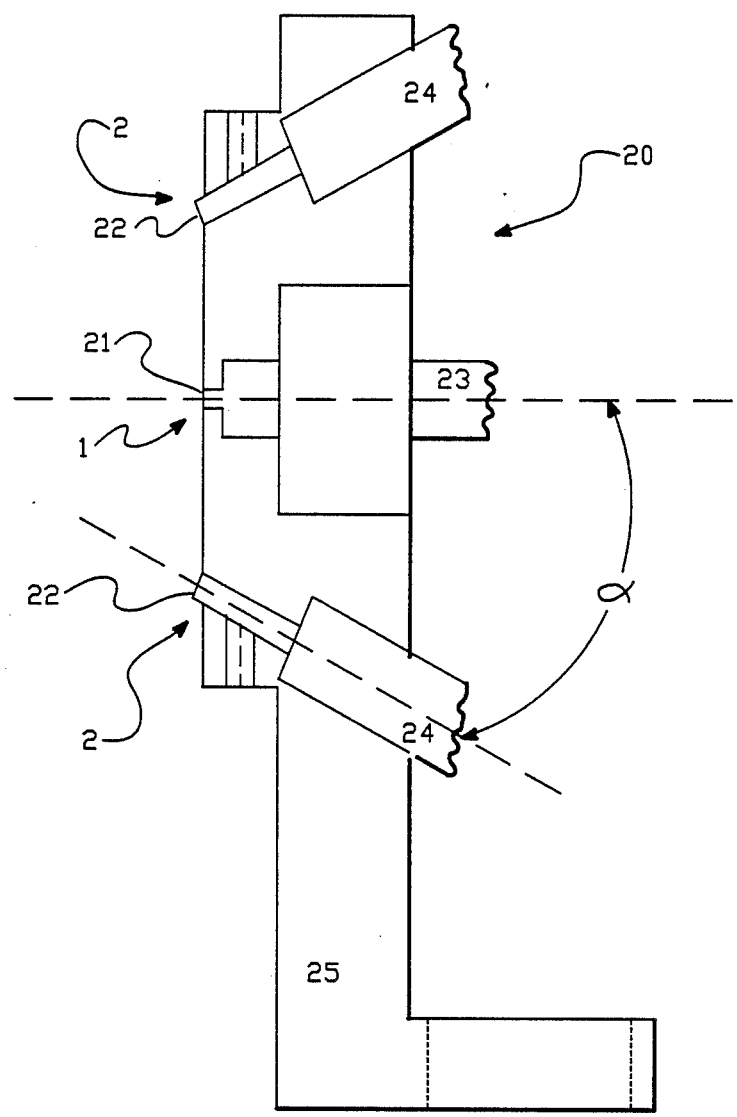
FIG. 2 is a partial fragmentary view of FIG. 1, taken through the horizontal plane intersecting light transmission face 21, showing a section view of the light transmission means of the present invention.
Figure 3:
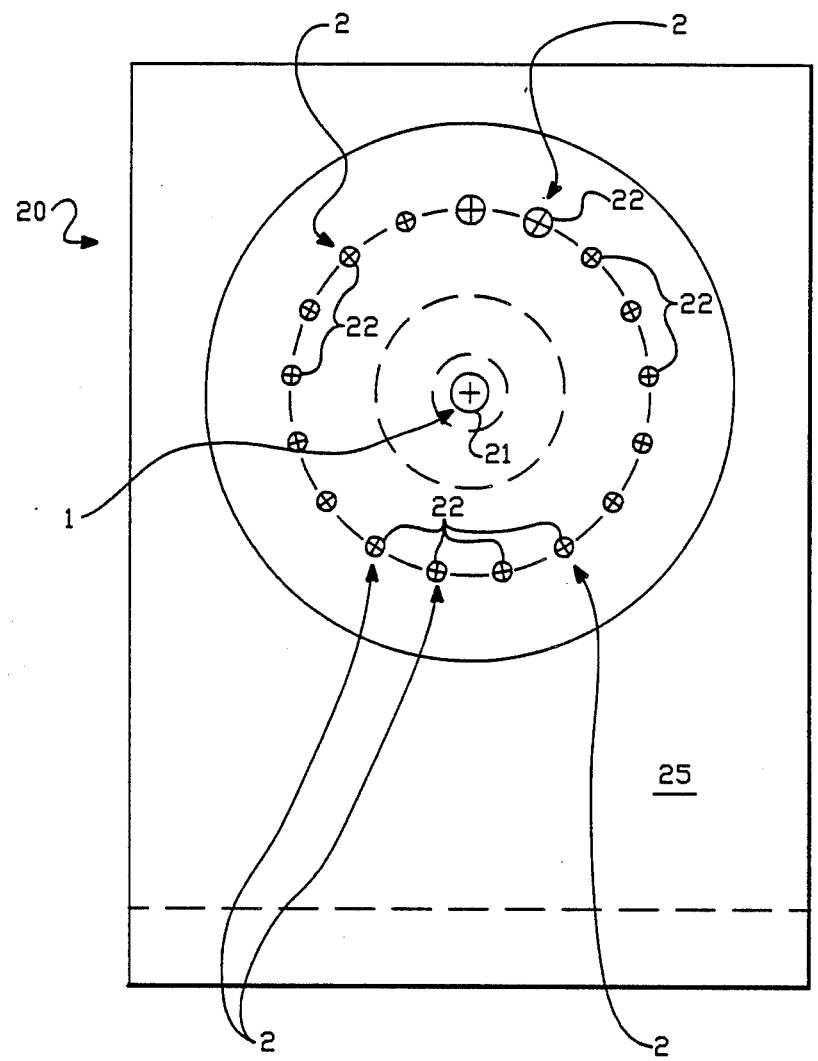
FIG. 3 is a front plan view of the light transmission means.

Referring back to FIG. 1, in conjunction with FIGS. 2–3, light transmission means 20 has a light transmission face, 21, at first location 1 and a light transmission face, 22, at each of the second locations 2. Light transmission means 20 is positioned at substantially the focal plane, 17, of mirror 10 (shown schematically in FIGS. 4–6). As best seen in FIG. 3, the second locations 2 are concentrically disposed about the first location 1.

Light transmission face 21 at first location 1 is substantially parallel to focal plane 17 of mirror 10 and substantially perpendicular to the mirror's axis 13, as shown in FIG. 1. Light transmission face 22 at each of second locations 2 is at an angle α to the focal plane of the mirror, that angle being defined, in degrees, by the following relation:

$$\alpha = \text{ARC TAN} \frac{a}{b}$$

wherein a is the distance between the center of a light transmission face 21 at first location 1 and the center of a light transmission face 22 at one of the second locations 2; and b is the length of a line normal to focal plane 17 and extending between first location and the reflective surface of mirror 10, as best seen in FIGS. 4–6.

For the spherical mirror shown schematically in FIG. 4, angle α is equal to 27°. Thus, as shown in FIG. 2, light transmission faces 22 at second location 2 are at an approximate angle of 27° to the focal plane of the mirror. At this angle, maximum quantity of light is collected at the light transmission face 1 or 2 operating as the output. Referring to FIGS. 4–6, it will be seen that light rays input at point $F_I$, representing, for instance, light transmission face 21, will intersect at point $F_O$ on the focal plane of the mirror, defining, for instance, a second light transmission face 22. At this angular orientation, the coincidence of reflected light is greatest, and thus, as shown in FIG. 2, second faces 22 are positioned at that angle.

As shown in FIG. 3, a plurality of second light transmission faces 22 may be provided in equidistant relation to each other and first light transmission face 21, once the focal plane 17 of mirror 10 is determined and angle o is calculated.

Preferably, light transmission means 20 comprises a plurality of fiber optic cables 23 and 24. The cable 23 is positioned at first location 1 and each of a plurality of cables 24 is positioned at one of the second locations 2, as best seen in FIG. 1. Also, as seen in FIG. 2, the diameters of fiber optic cables 24 are substantially equal to each other and the diameter of fiber optic cable 23 is substantially unequal to the diameter of cables 24. It is preferred that the cable, or cables, serving as the light input have a substantially smaller diameter than the cables or cable serving as the light output.

In a preferred embodiment, fiber optic cables 23 and 24 are mounted in a unitary mounting member, 25, to ensure that the proper angular disposition of the cable is maintained. Mounting member 25 is, in turn, adjustably secured by means of mounting bracket 27, through which motor shaft 33 of motor 31 extends. It should be noted that the axis 34 of the motor shaft 33 is displaced from and therefore eccentric to the axis 13 of the mirror 11. Because the distance b between the reflective surfaces of mirror 10 and focal plane 17 will vary as a function of the shape of mirror used, i.e., spherically concave, elliptically concave, or parabolicly concave and its radius of curvature, the position of mounting member 25 can be adjusted by means of adjusting screw 26 to move mounting member 25, and thereby light transmission faces 21 and 22, closer to or further from reflective surface 11 of mirror 10.

By this arrangement, the optical switch of the present invention may have a single output cable and a plurality of concentrically disposed input cables or a single input cable and a plurality of concentrically disposed output cables, thereby being capable of switching input light to a selected output or switching between selected different light sources feeding a single optical device connected to the single output. Because it is desirable that the greatest possible amount of light reflected from mirror 10 be collected, the fiber optic cable or cables functioning as the output or outputs should be greater in diameter than the cable or cables functioning as the input or inputs. For example, in FIG. 2, fiber optic cables 24 would connect to different optical devices and fiber optic cable 23 would connect to a single light source used to alternately illuminate the different devices.

Referring back now to FIG. 1, the optical switch of the present invention further comprises rotation means generally designated 30, connected to mirror 10 for eccentric rotation of mirror 10 to direct light between first location 1 and individual ones of second locations 2 depending upon the rotational position of mirror 10 about axis 34.

Rotation means 30 comprises motor 31 connected to mirror 10 through mirror mount 15 and having a rotatable motor shaft 33. Motor shaft 33 has its longitudinal axis 34 aligned with first location 1, and as can best be seen in FIG. 1, mirror 10 is mounted on shaft 33 eccentrically. The eccentric rotation of mirror 10, combined with the angular orientation of light transmission faces 22 ensures the maximum amount of light transmission from reflective surface 1!, irrespective of switching position.

Rotation means 30 further comprises control means, generally designated 35, connected to motor 31 and including electric power source 37 and computer controller 39. By means of control means 35, the rotation of shaft 33 and mirror 10 at selected second locations 2 is determined.

Motor 31 may be either a stepping motor or a direct current motor. If the latter, rotation means 30 must further comprise motor sensing means for activating and deactivating the motor.

Still referring to FIG. 1, rotation means 30 further comprises sensing means, generally designated 40, for sensing a defined home position of motor 31. In its preferred embodiment, sensing means 40 comprises an optical sensor 41 coupled to control means 35 and an encoder disk, 43, mounted on rotary shaft, 32, of motor 31, by means of screw 44 and sleeve 46. Encoder disk 43 is formed, in the usual manner, with an aperture (not shown), such that when optical sensor 41 detects the aperture upon rotation of encoder disk 43 on rotary shaft 32, the home position of the motor is defined. Because second faces 22 are equidistantly arranged about first face 21, as best seen in FIG. 3, defining the home position of the motor automatically defines a home position for mirror 10, such that the computer controller 39 can determine the direction and amount of rotation required to switch between first location and a selected one of second locations 2, in a manner known in the art.

While the foregoing detailed description provides a full and complete disclosure of the preferred embodiments of the invention, various modifications, alternate constructions, and equivalents may be employed without departing from the scope of the invention. Accordingly, the foregoing description and illustrations should not be construed as limiting the scope of the invention, defined by the following claims.

I claim:

1. An optical switch for transmitting light between a first location and a selected one of a plurality of second locations comprising:
   a mirror having a concave, reflective surface, a focal plane, and an axis;
   light transmission means facing said mirror and having a light transmission face at said first location and each of said second locations, said light transmission faces of said second locations being positioned at an angle greater than zero degrees with said focal plane; and
   means connected to said mirror for eccentric rotation thereof relative to said axis to direct said light between said first location and individual ones of said second locations depending upon the rotational position of said mirror about said axis.

2. The optical switch of claim 1 wherein said light transmission means is positioned at substantially the focal plane of said mirror, said second locations being concentrically disposed about said first location, whereby eccentric rotation of said mirror relative to said axis results in light transmission between said first location and an individual one of said concentrically disposed second locations.

3. The optical switch of claim 1 wherein said light transmission face at said first location is substantially parallel to the focal plane of said mirror and substantially perpendicular to the axis thereof, and said light transmission face at each of said second locations is an angle alpha to said focal plane, said angle alpha being defined by the following relation:

$$\text{alpha} = \text{ARC TAN} \frac{a}{b}$$

wherein a+distance between the center of the light transmission face at said first location and the center of the light transmission face at one of said second locations;
   and wherein b+length of a line normal to the focal plane and extending between said first location and said reflective surface of said mirror.

4. The optical switch of claim 3 wherein said mirror is a spherically concave mirror.

5. The optical switch of claim 3 wherein said mirror is an elliptically concave mirror.

6. The optical switch of claim 3 wherein said mirror is a parabolicly concave mirror.

7. The optical switch of claim 3 wherein said rotation means comprises a motor connected to said mirror and having a rotatable shaft, said shaft having a longitudinal axis aligned with said first location and said mirror being mounted eccentrically on said shaft, said rotation means further comprising control means for controlling the rotation of said shaft.

8. The optical switch of claim 7 wherein said motor is a stepping motor.

9. The optical switch of claim 7 wherein said motor is a direct current motor and said rotation means further comprises motor sensing means for activating and deactivating said direct current motor.

10. The optical switch of claim 7 wherein said rotation means further includes sensing means for sensing a defined, home position of said motor.

11. The optical switch of claim 10 wherein said sensing means comprises an optical sensor coupled to said control means to sense said home position of said motor and signal said position to said control means.

12. The optical switch of claim 1 wherein said light transmission means comprises a plurality of fiber optic cables, one of said cables being positioned at said first location and each of the remainder of said cables being located at one of said plurality of second locations.

13. The optical switch of claim 12 wherein the diameters of said cable at said second location are substantially equal to each other and the diameter of said cables at said first location is substantially unequal to the diameters of the cables at said second location.

14. The optical switch of claim 13 wherein the larger diameter cable(s) is (are) output cable(s) and the smaller diameter cable(s) is (are) input cable(s).

15. The optical switch of claim 14 wherein all of said fiber optic cables are mounted in a unitary mounting member.

* * * * *